May 24, 1949. V. L. COLORIGH 2,471,096
DISAPPEARING BOLSTER FOR VEHICLES
Filed Nov. 10, 1947
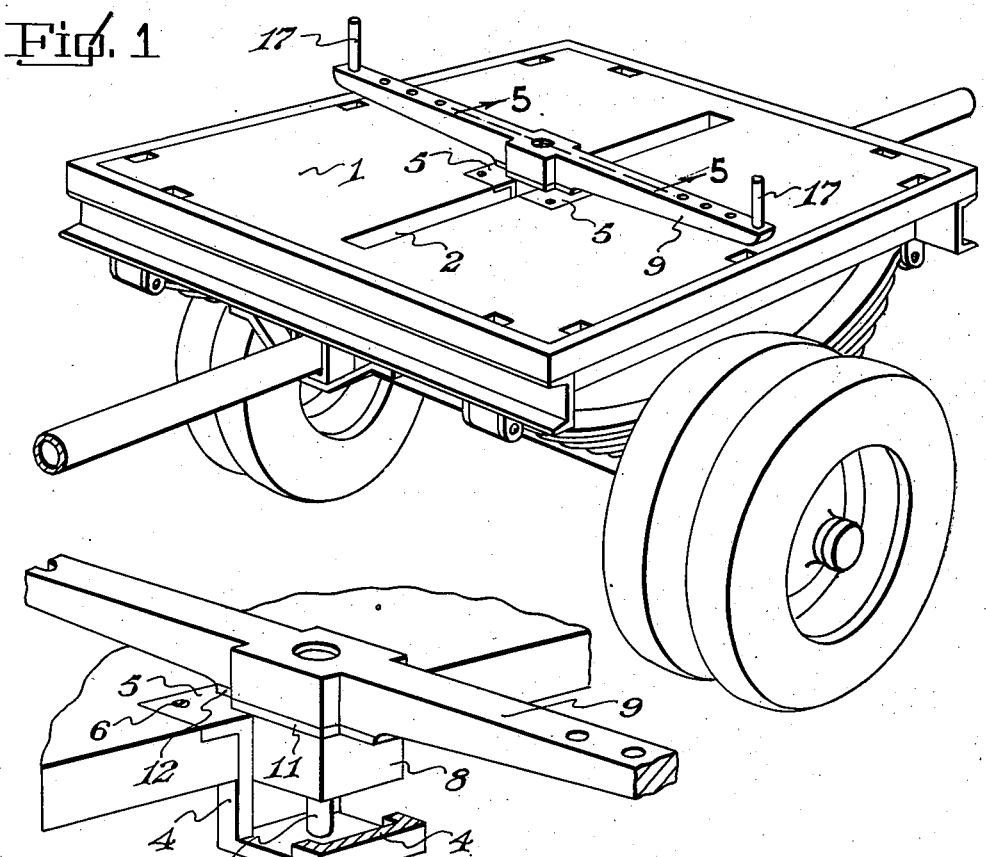
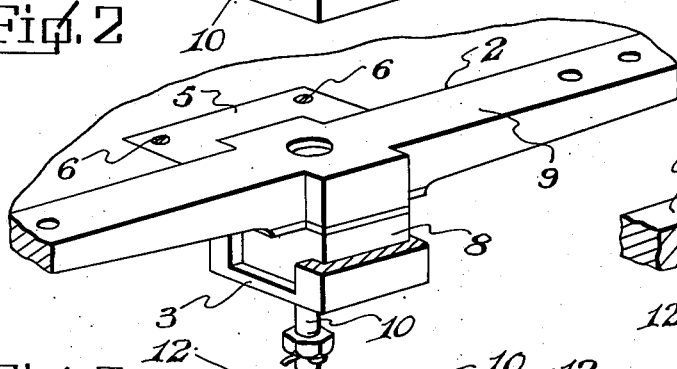
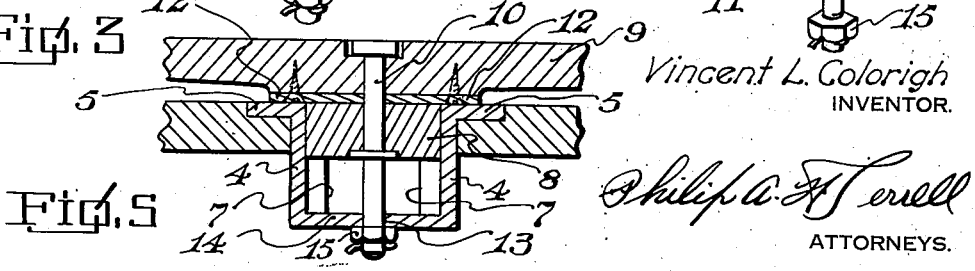
Vincent L. Colorigh
INVENTOR.
ATTORNEYS.

Patented May 24, 1949

2,471,096

UNITED STATES PATENT OFFICE 2,471,096

DISAPPEARING BOLSTER FOR VEHICLES

Vincent L. Colorigh, Tulsa, Okla.

Application November 10, 1947, Serial No. 785,083

3 Claims. (Cl. 280—143)

The invention relates to disappearing bolsters for heavy duty vehicles, particularly the type used in oil fields for transporting heavy pipe sections, and has for its object to provide a bolster which may be easily and quickly elevated from a position flush with the floor of the vehicle, and utilized for transporting long elements, and may be again lowered into the floor, so other articles may be hauled, for instance heavy machinery, without intereference from the bolster.

A further object is to provide the floor of the vehicle with a longitudinally extending chamber for the reception of the bolster, and to provide a vertically movable block in a downwardly extending U-shaped bracket in the floor, extending across the bolster chamber, said block taking the strain and distributing the same on the bracket.

A further object is to provide a pivot bolt extending through the bolster, the block and the transverse portion of the U-shaped bracket and on which pivot pin the bolster rotates to transverse operative position, or to longitudinal position within the chamber in the floor.

A further object is to interpose a wear plate between the under side of the bolster and the block, and of sufficient length so its ends will rest on the oppositely extending flanges of the U-shaped bracket when the bolster is in transverse operative position.

With the above and other objects in view the invention resides in the combination and arrangement of parts as hereinafter set forth, shown in the drawing, described, and claimed, it being understood that changes in the precise embodiment of the invention may be made within the scope of what is claimed without departing from the spirit of the invention.

In the drawing:

Figure 1 is a perspective view of a conventional form of two-wheel trailer vehicle, showing the disappearing bolster applied thereto.

Figure 2 is a detail perspective view of a portion of the bolster mounting, parts being broken away to better show the structure.

Figure 3 is a view similar to Figure 2, showing the bolster in inoperative position.

Figure 4 is a perspective sectional view through the bolster pivotal mounting.

Figure 5 is a transverse sectional view taken on line 5—5 of Figure 1.

Referring to the drawing, the numeral 1 designates the floor of the truck body and 2 a longitudinal opening in said floor. Arching the under side of the opening 2 is a U-shaped bracket 3, the arms 4 of which extend upwardly and terminate at their upper ends in oppositely extending flanges 5, which flanges are embedded in the floor 1 and secured thereto, by means of screws 6. The arms 4 are provided with edge flanges 7, and guidably mounted between the arms 4 is a rectangularly shaped block 8, which block does not rotate, but slides upwardly and downwardly when the pivoted bolster 9 is rotated on the pivot pin 10.

Secured to the under side of the bolster 9 is a wear plate 11, of sufficient width, so that its end 12 will bear on the flanges 5 of the bracket when the bolster is raised out of the opening 2, and rotated to the position shown in Figure 1. Bolt 10 extends downwardly and is slidably mounted in an aperture 13 in the transverse portion 14 of the U-shaped bracket and is limited in its upward movement by a nut 15.

Block 8 is held in fixed position on the bolt 10 by a collar 16.

It will be seen that when it is desired to have the floor of the truck clear of all obstructions, it will be necessary, only, to rotate the bolster 9 to longitudinal position, where it will be received within the opening 2, and at which time the central portion of the bolster will register with the chamber of the U-shaped bracket, and then the bolster will move downwardly to a position flush with, or below the floor surface, after which the load holding pins 17 are removed from the bolster. It will be seen that in this inoperative position the entire floor of the truck is clear of all obstructions, hence machinery or other items may be placed on the truck, and at the same time the bolster does not become a tripping hazard to workers on the truck.

By providing the bearing block 8 in the U-shaped bracket, it is obvious the bolster is laterally braced, and that the bracket will distribute any lateral strains, laterally, on the floor of the truck.

The invention having been set forth, what is claimed as new and useful is:

1. In combination with a vehicle floor, of a bolster carried thereby and adapted to be housed in said floor with its upper side flush with the upper side of the floor, a longitudinally extending bolster receiving chamber in the floor, a supporting bracket within the bolster chamber and spaced from its ends, a vertically removable bolster carrying block in said bracket and forming means whereby the bolster can be raised from the floor chamber and transversely positioned in relation to the chamber, said bolster being pivotally connected to the vertically movable block within the bracket.

2. A device as set forth in claim 1 wherein the vertically movable block is rectangularly shaped and vertically slidable in bearings of the bracket, a pivot pin carried by the block and on which the bolster is rotatably mounted, said pivot pin having a sliding bearing in the bracket.

3. A device as set forth in claim 1 wherein the under side of the bolster around its pivotal point is provided with a wear plate which engages opposite sides of the bracket when the bolster is in transverse relation to the longitudinal chamber in the floor.

VINCENT L. COLORIGH.

REFERENCES CITED

The following references are of record in the file of this patent:

UNITED STATES PATENTS

| Number | Name | Date |
| --- | --- | --- |
| 975,475 | Stevens | Nov. 15, 1910 |